US006079593A

United States Patent [19]

Konrad

[11] Patent Number: 6,079,593

[45] Date of Patent: Jun. 27, 2000

[54] STORAGE CONTAINER FOR STACKABLE CONSUMER ARTICLES

[75] Inventor: Franz Konrad, Regau, Austria

[73] Assignee: C.A. Greiner & Sohne Gesellschaft m.b.H., Kremsmunster, Austria

[21] Appl. No.: 09/142,117

[22] PCT Filed: Feb. 28, 1997

[86] PCT No.: PCT/AT97/00039

§ 371 Date: Sep. 4, 1998

§ 102(e) Date: Sep. 4, 1998

[87] PCT Pub. No.: WO97/32665

PCT Pub. Date: Sep. 12, 1997

[30] Foreign Application Priority Data

| | | | |
|---|---|---|---|
| Mar. 7, 1996 | [AT] | Austria | 427/96 |
| Aug. 7, 1996 | [AT] | Austria | 1425/96 |

[51] Int. Cl.[7] B65G 59/00

[52] U.S. Cl. 221/299; 206/499

[58] Field of Search 221/92, 103, 107, 221/123, 130, 299; 206/499; 422/104

[56] References Cited

U.S. PATENT DOCUMENTS

| | | | |
|---|---|---|---|
| 5,392,914 | 2/1995 | Lemieux et al. | 206/499 |
| 5,470,538 | 11/1995 | Lind | 422/104 |

FOREIGN PATENT DOCUMENTS

| | | |
|---|---|---|
| 2 174 322 | 10/1973 | France . |
| 1 918 629 | 11/1969 | Germany . |
| 1 554 664 | 3/1970 | Germany . |
| 1 817 547 | 7/1970 | Germany . |
| 44 19 291 A1 | 12/1995 | Germany . |
| 44 36 473 A1 | 3/1996 | Germany . |

*Primary Examiner*—Kenneth W. Noland
*Attorney, Agent, or Firm*—Alston & Bird LLP

[57] ABSTRACT

The invention describes a storage container (7), a slide, in particular for a shaft-like storage container (7) and an unloading device for unloading stacked palettes (2), in particular holed palettes for pipette strips (5). The storage container (7) is for holding a plurality of stackable consumer articles (1), such as palettes (2) fitted with small components, and comprises a cuboid shaft housing adjusted to the shape of the consumer articles (1) and a base opening (18). The storage container (7) also comprises openings (15, 16) in at least two opposite side walls (12, 13) at the same height close to the ground, wherein the openings (15, 16) are at a height (33) which is greater in stacking direction than the vertical distance (34) between the holding edges (6) of two stacked consumer articles (1).

52 Claims, 11 Drawing Sheets

STORAGE CONTAINER FOR STACKABLE CONSUMER ARTICLES

Figure 1:
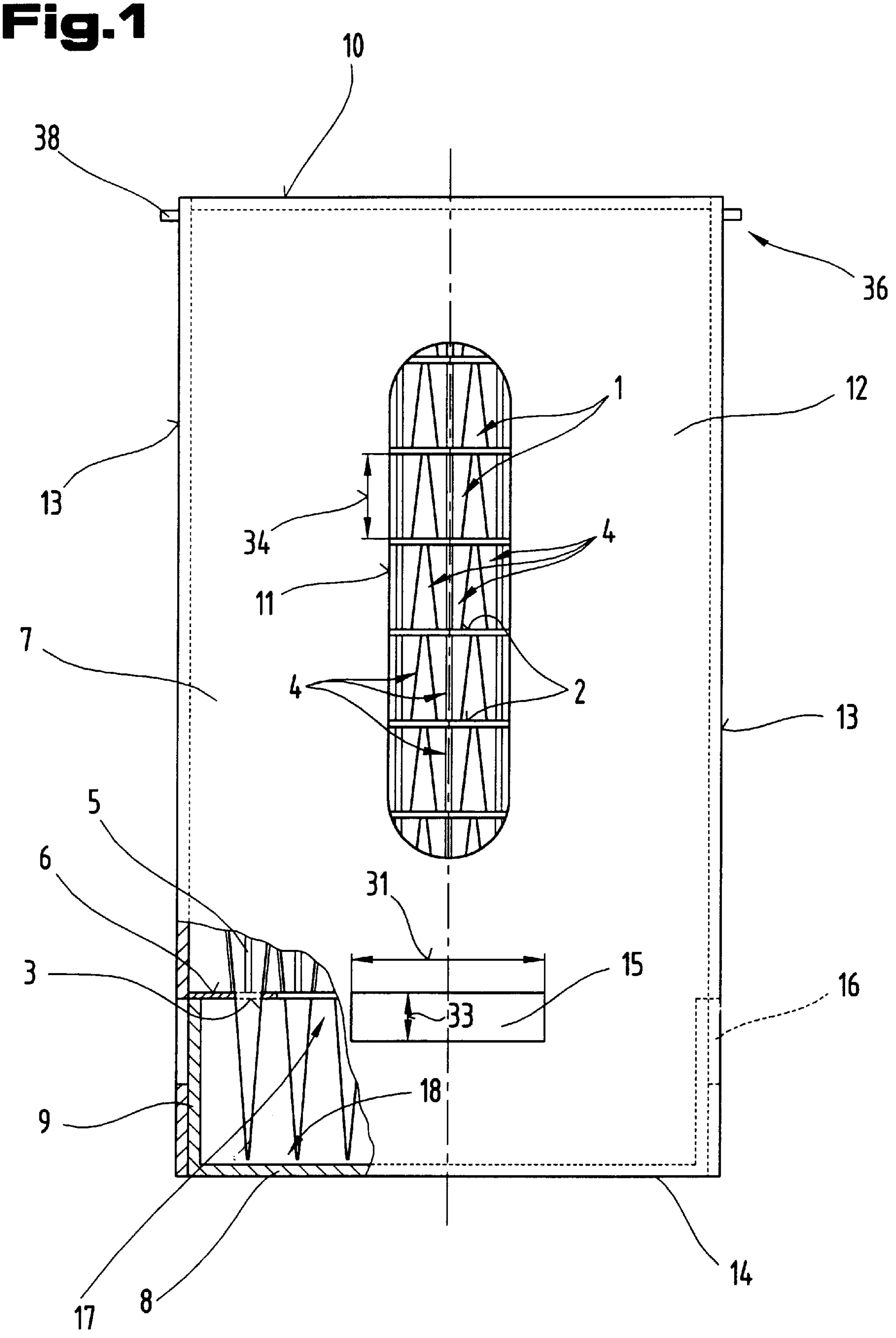

The invention relates to a storage container, an unloading device and a slide for removing palettes, as described in the preambles of claims 1, 2, 14 and 29.

Such unloading devices and storage containers are used to remove consumer articles stacked therein, e.g. articles on palettes, for example pipette tips inserted into holed palettes and the like, separately palette by palette from the storage container.

A careful procedure is necessary in order to protect the pipette tips from dirt, whereby the storage container also functions as a packaging container. Such a device for making available a plurality of objects, in particular pipette tips, and a method for providing them is known according to DE 44 19 291 A1. With this device or according to this method the pipette tips, which are packed stacked inside one another in columns owing to their cone-shape, are unloaded individually by means of a device, wherein the device has a base plate provided with openings, onto which the packaging box open on the ground is placed. The openings in the base plate are, for the passage of the pipette tips and to keep the latter inside the packaging, adjustable in size or position. A disadvantage here is the undefined position of the columns of pipette tips in the packaging and the associated difficulty of assignment with opened packaging to the openings of the removal device.

The objective of the invention is to create a storage container, a slide and an unloading device for removal in order to obtain transportation in which the goods are protected and kept away from environmental influences, and easy handling for the separate unloading of the goods directly from the storage container.

The objective of the invention is achieved by the characterising features of claims 1 and 2. The surprising advantage is that the storage container can hold a stack of consumer articles predetermined by the height of the storage container, whereby by inserting the stack into the storage container from the base or lid side or placing the storage container over a stack an automated and thereby also sterile packaging is possible. Then to remove individual consumer articles only the assigned slide needs to be pushed onto the storage container, which by sliding backwards and forwards relative to the storage container after opening or removing the base opening permits the separate unloading of consumer articles from the bottom of the stack. Owing to its simple design the storage container can be manufactured efficiently and from different materials, preferably the housing can also be made of cardboard or plastic. In this way an easy to handle and safe functioning storage container is produced, which is suitable for storing and unloading different consumer articles, in particular items that have to be packed carefully and in sterile conditions. The combination of a holding arm adjustable perpendicular to a base opening of a storage container with a limit stop connected movably therewith, which can be adjusted between a holding and release position, forms a very simple, safe functioning unloading device, which permits the individual removal of the bottom palette in a stack of palettes at the same time protecting the palettes from environmental effects during the separation and removal.

The preferred development according to claim 3 permits at any time the use of an separating device on the storage container, so that no additional equipment is required for the individual removal of palettes from the storage container.

By means of having different openings in the side walls according to claim 4 with different separating sequences the separate removal of palettes can be achieved.

A simple design of the separating device and the separating sequence can be achieved by the embodiment according to claim 5.

By means of the development according to claim 6 in a simple manner the filling level of the storage container can be continually checked.

The preferred embodiment according to claim 7 permits a controlled movement of the separating device without the slide becoming detached from the guiding region of the storage container.

By means of the design according to claim 8 the storage container can be used at the same time as a magazine for removing the palettes.

The embodiment according to claim 9 simplifies not only the loading of the storage container, but also permits the refilling thereof or the repacking of palettes if too many have been removed from the storage container by mistake.

An embodiment according to claim 10 is also advantageous as thereby without additional measures palettes can also be inserted into the storage container, which are projected over by the parts inserted therein in the direction of the base opening.

An economical manufacture of the storage container is also possible by means of the characteristics according to claim 1.

A development according to claim 12 is also advantageous, as in this way the use of only one slide for separating the palettes is required.

The design according to claim 13 is also advantageous, as in this way the storage container can also be used simultaneously for the transport of the palette and for the subsequent unloading thereof.

The objective of the invention can also be achieved independently by means of the slide according to claim 14. It is advantageous in this case that by only pushing the slide backwards and forwards on the outside of the storage container by means of limit stops arranged thereon the consumer articles can be held in the storage container, and on deforming the limit stops or the holding arms by the resulting release of the palettes or consumer articles the latter can be removed individually from the storage container for example, whereby by means of the elastic restoring action of the holding arms further consumer articles or palettes can be reliably prevented from falling out.

A simple manufacture from elastically resilient materials and a longer lifetime is achieved by the characteristics according to claim 15.

A design according to claim 16 is also advantageous as thereby consumer articles which slide down before the latter can pass through the base opening are held back until the consumer article or palette previously released has passed through the base opening of a storage container.

In addition, a design according to claim 17 is advantageous, in which it is ensured that with every sliding action of the slide only one consumer article or one palette can be removed individually.

A longer lifetime and a greater retaining force can be obtained by the development according to claim 18.

A development according to claim 19 is also possible, by means of which a simplified design of the slide can be obtained.

A user-friendly solution for the slide is characterised in claim 20. In this case it is advantageous, if the guiding sleeve is designed according to claim 21.

A simple manufacture from a uniform material for the slide is permitted by the additional design according to claim 22, whereby an optically advantageous design is achieved by a solution according to claim 23.

A safe separation and exact guiding of the packaging units can be achieved by the development according to claim 24.

The design according to claim 25 is also advantageous, as by means of a precise guiding of the holding arms a lengthened period of use is ensured.

A high load-bearing slide is obtained by the design according to claim 26.

By means of the designs of the slides according to claim 27 and 28 a simplified operation for the separation can be obtained.

The objective of the present invention is also achieved independently by the unloading device according to claim 29. By means of the action of the limit stops projecting over the openings into the storage container by sliding the slide into a position, in which it is pressed out of the openings, a consumer article can be released, and in another position the consumer articles can be held back in the storage container.

By means of the additional design according to claim 30 the simultaneous removal of several consumer article is reliably prevented.

A division of the holding and release forces on the palettes or consumer articles is achieved by the embodiment according to claim 31.

The characteristics according to claims 32 and 33 permit simple operation. A smooth functioning of the individual holding arms is achieved by the development according to claims 34 to 36.

For consumer articles of low weight an embodiment according to claim 37 or 38 is recommended.

The designs according to claims 39 to 44 prevent the incorrect operation of the storage container and also ensure in a powerless state the precise removal of the consumer articles.

The adjusting force for the slide and thereby the loading of the storage container by the separation process is obtained mainly by the embodiments according to claims 45 to 51.

The lifetime of the slide can finally be extended by means of the embodiment according to claim 52.

The invention is explained in more detail in the following by way of embodiments illustrated in the drawings.

Figure 2:
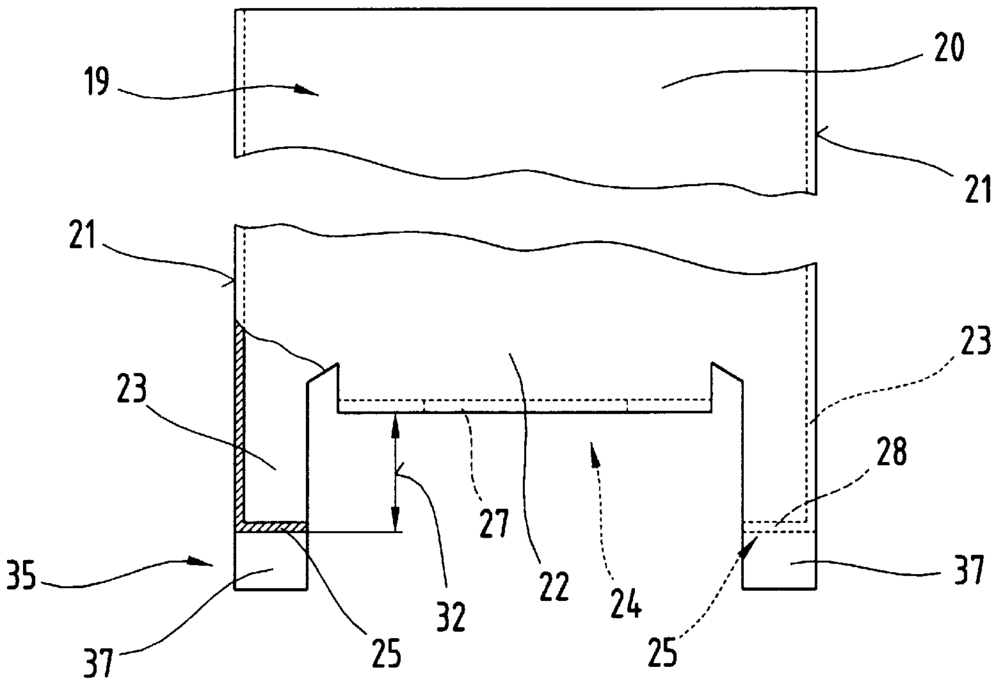
Figure 3:
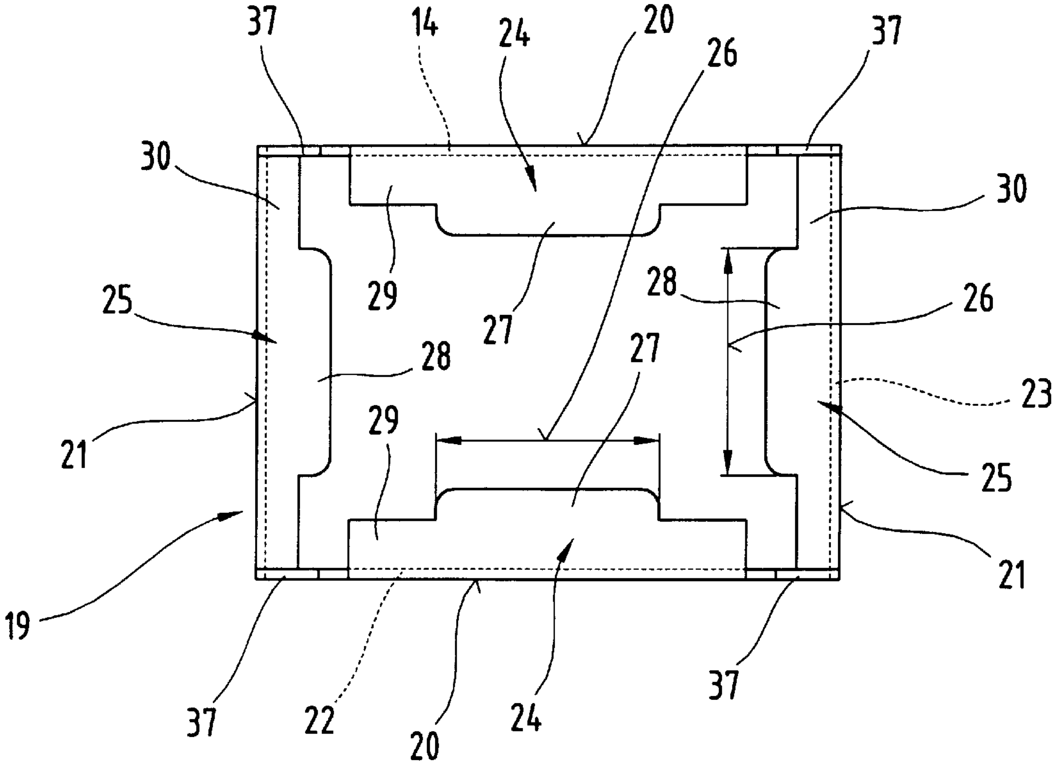
Figure 4:
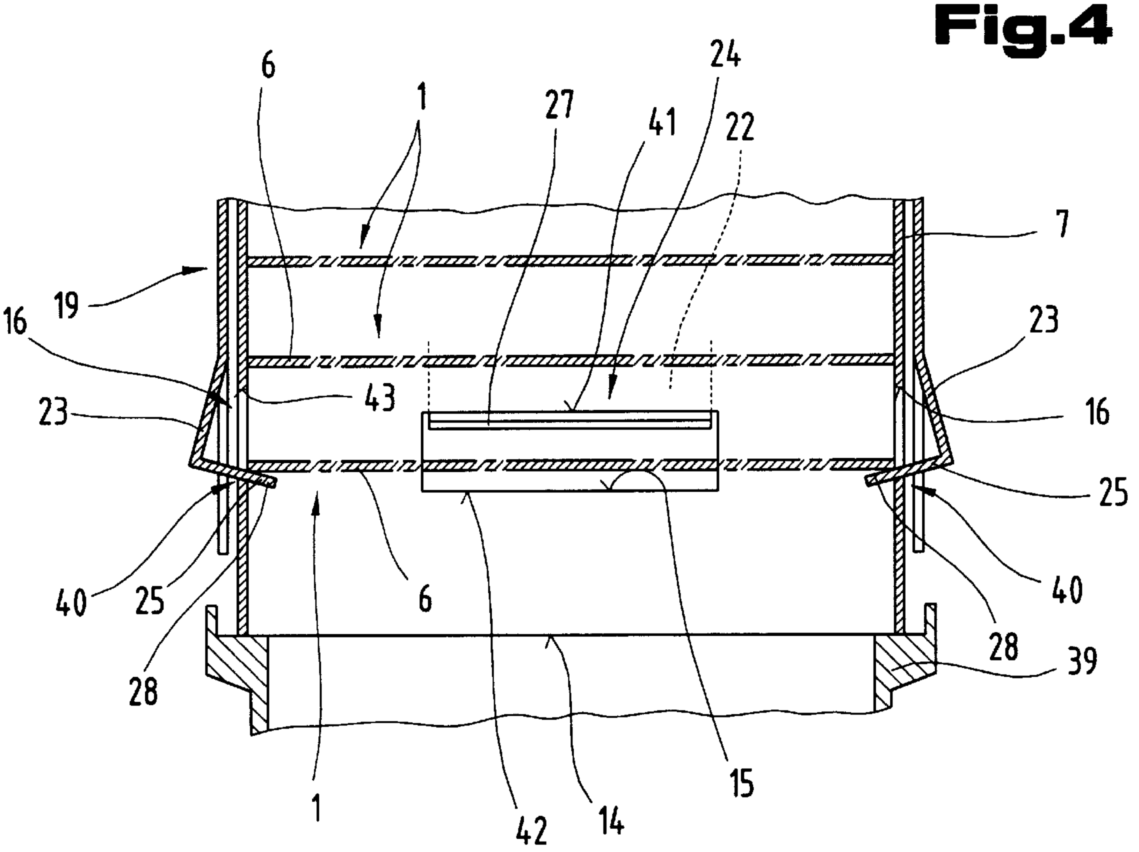
Figure 5:
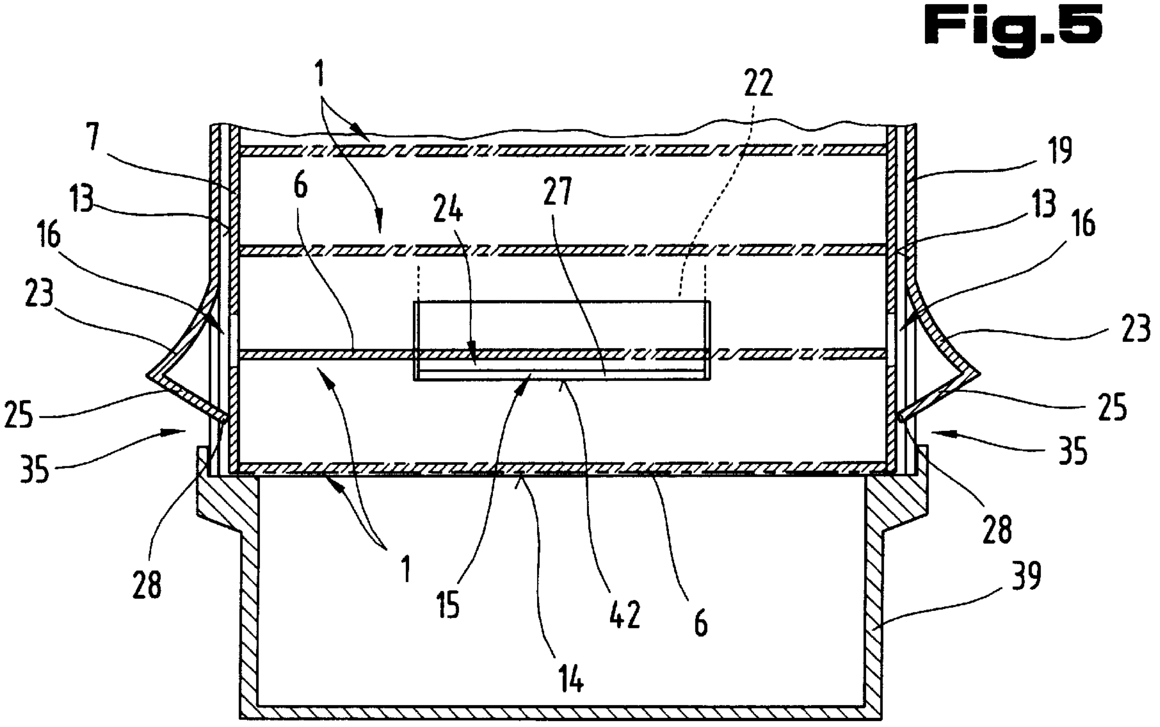
Figure 6:
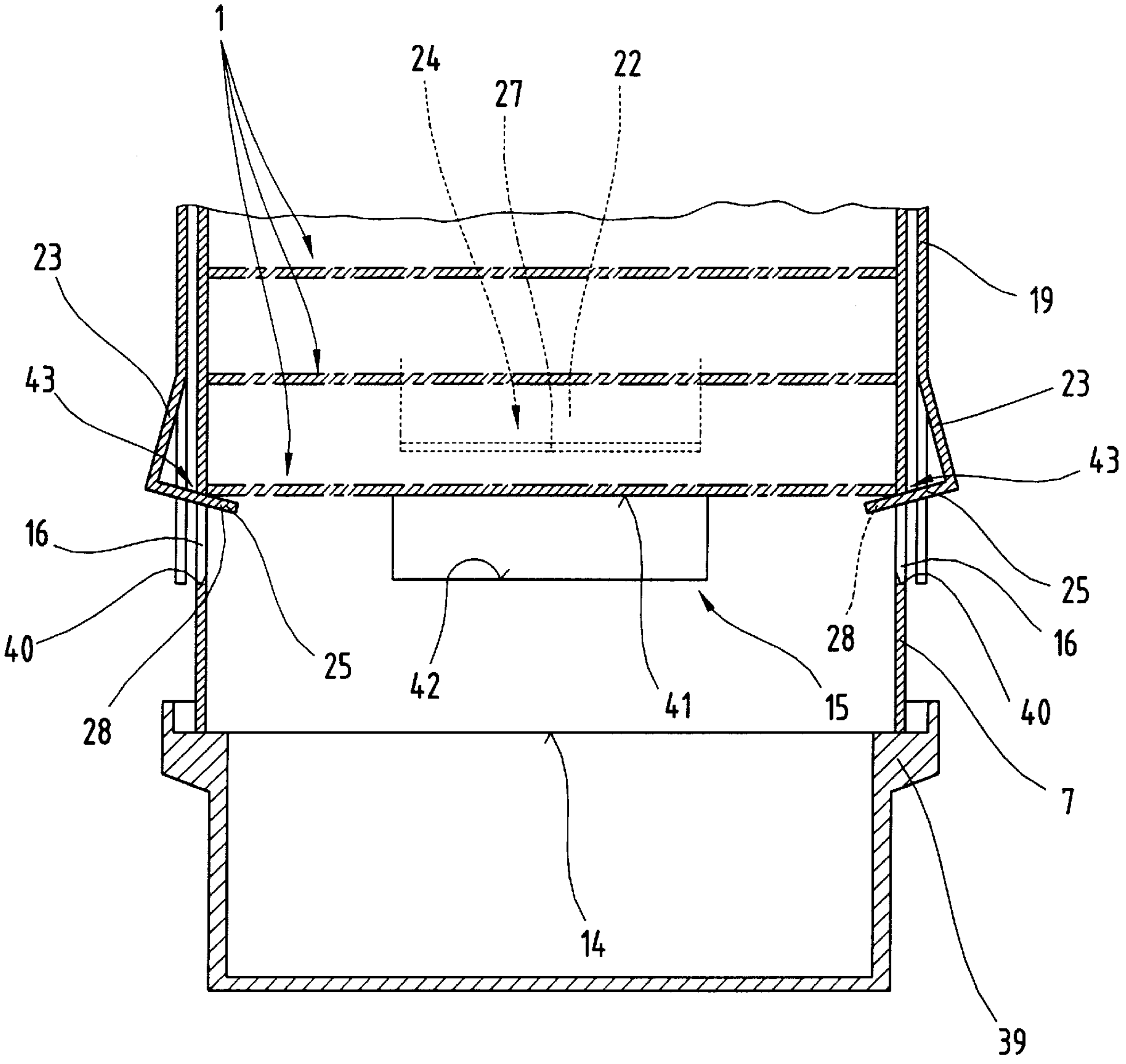
Figure 7:
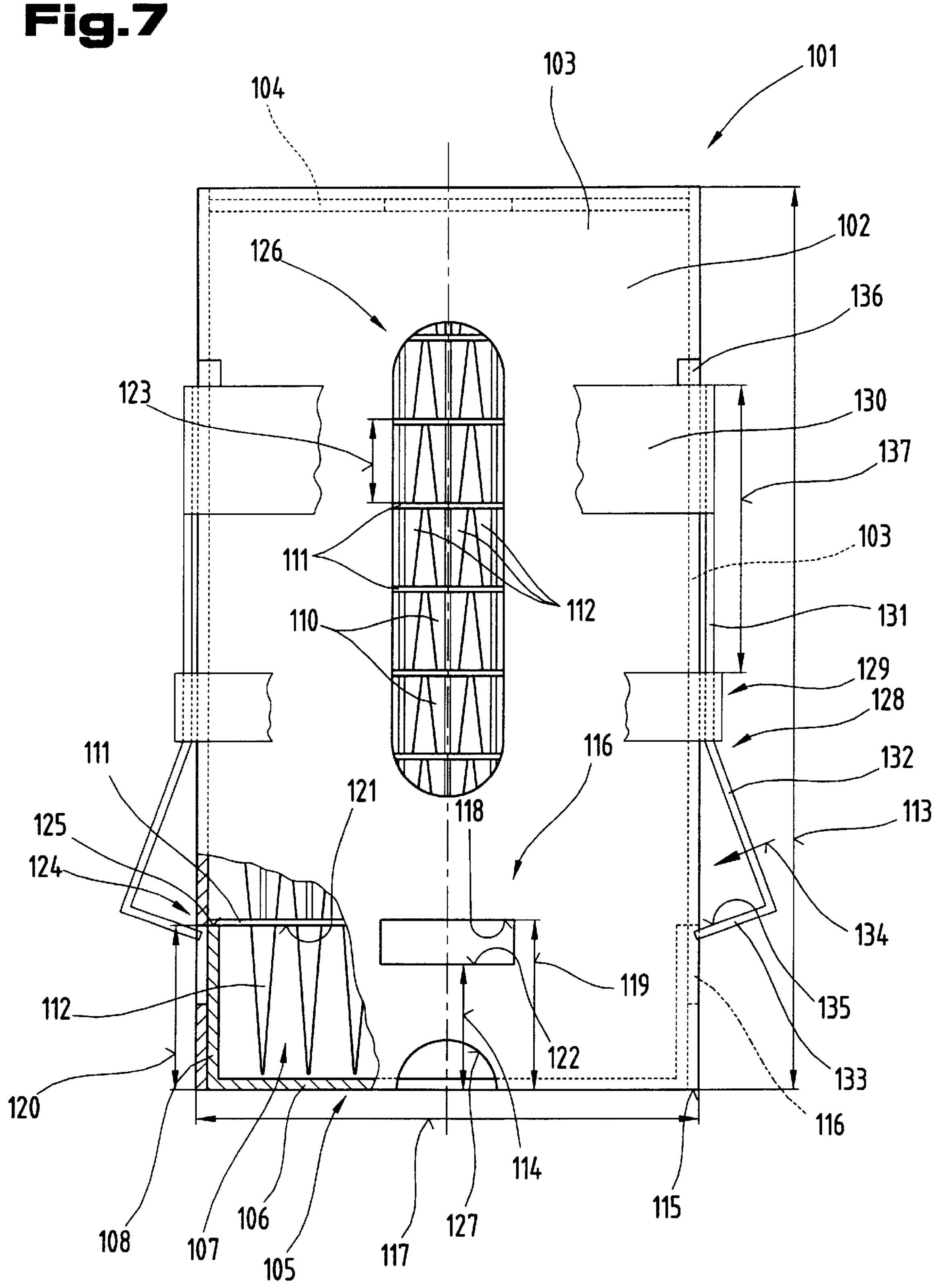
Figure 9:
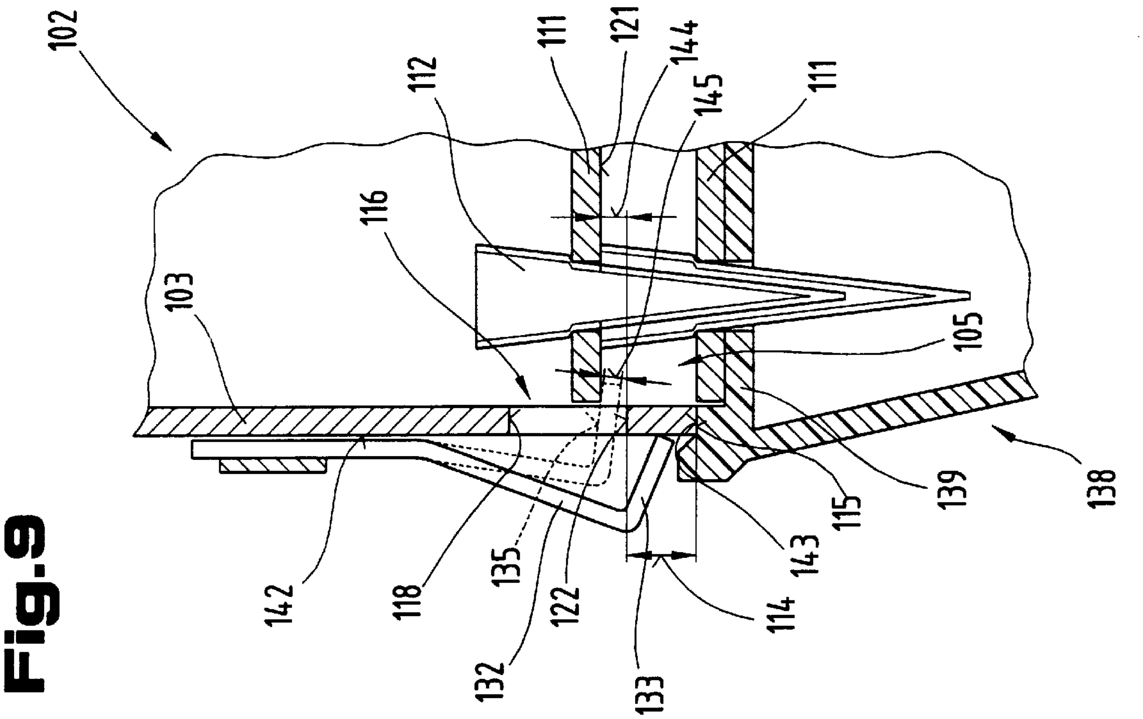
Figure 8:
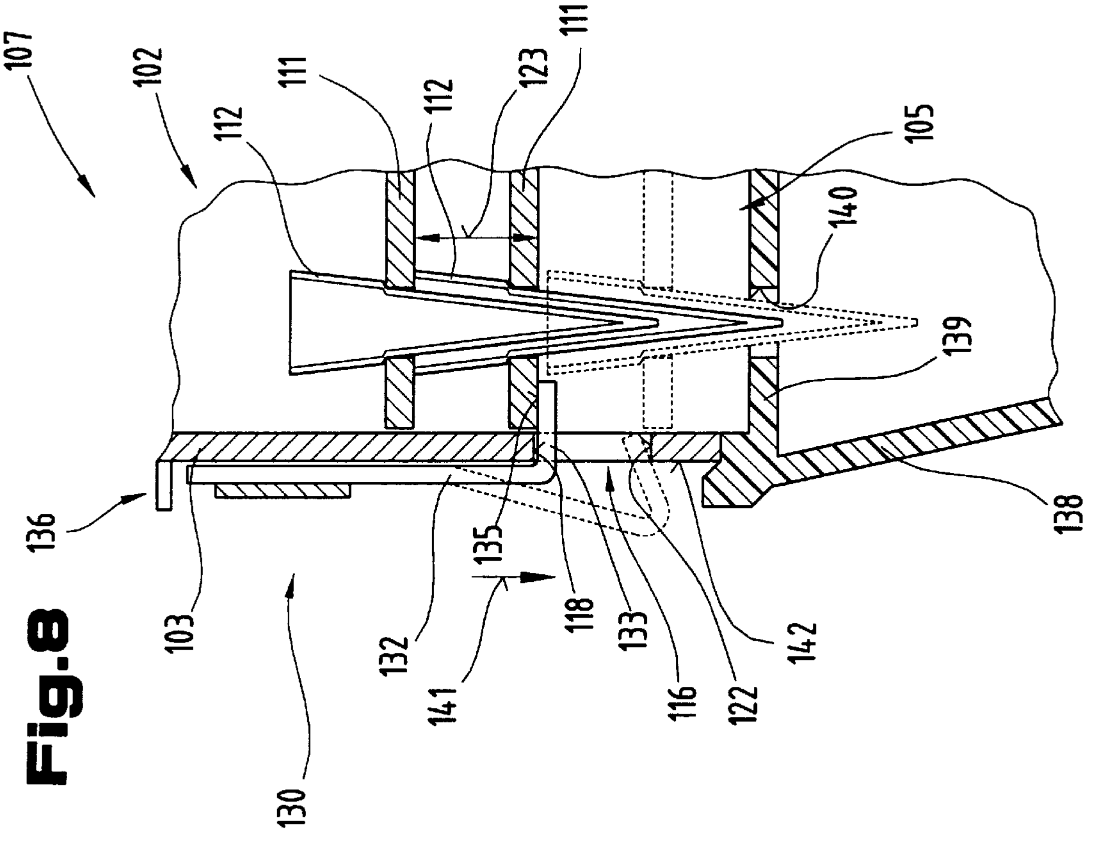
Figure 10:
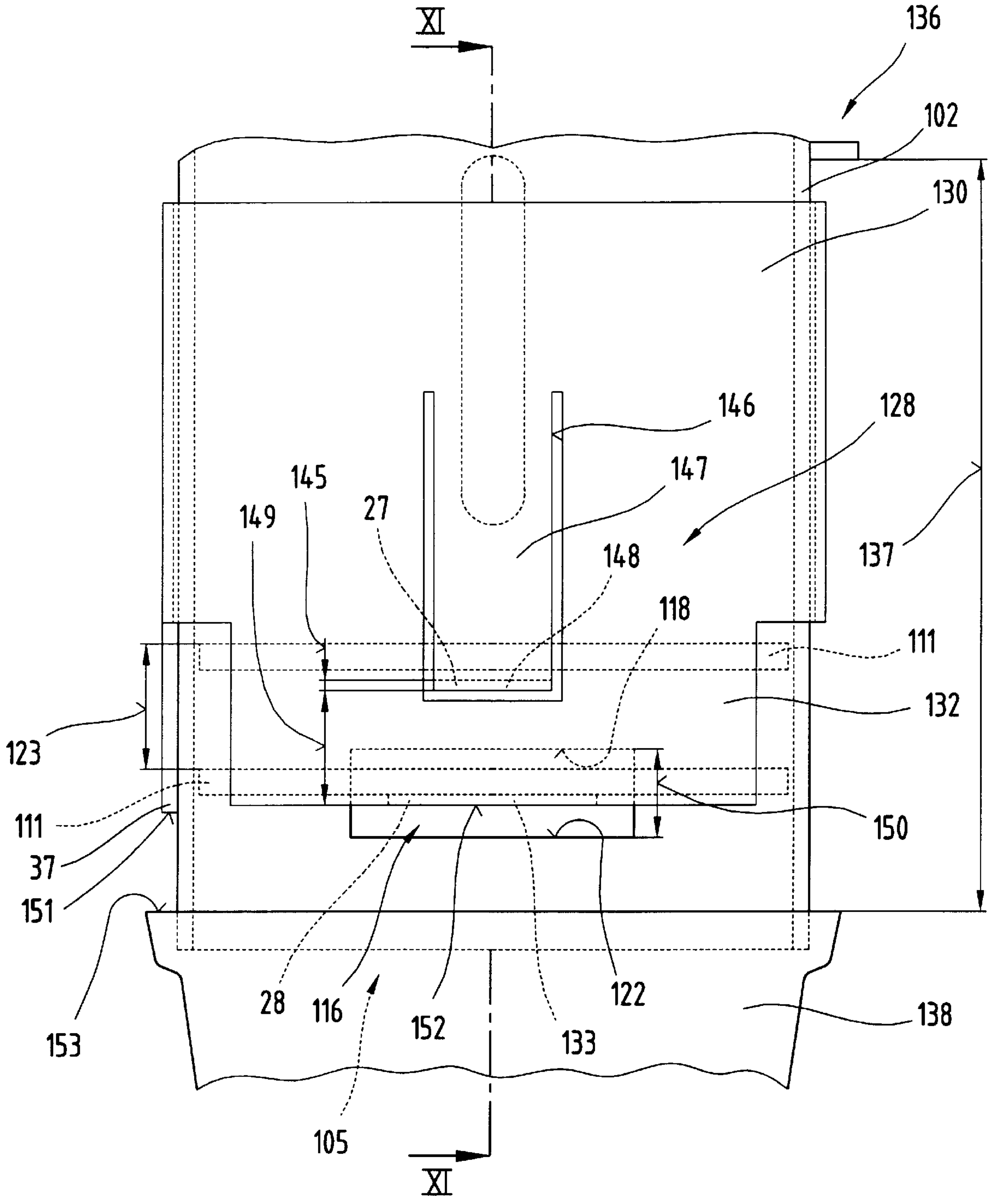
Figure 11:
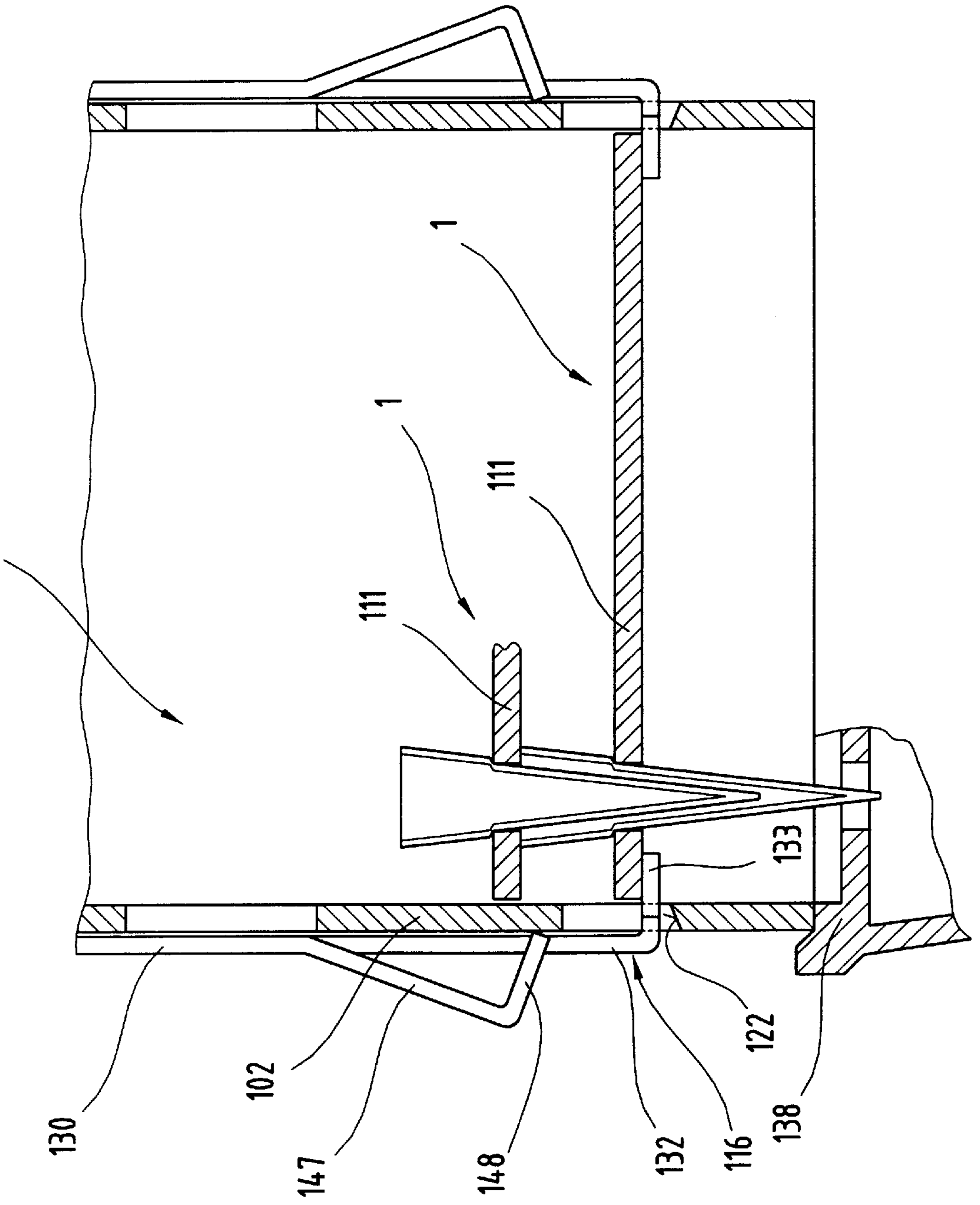
Figure 12:
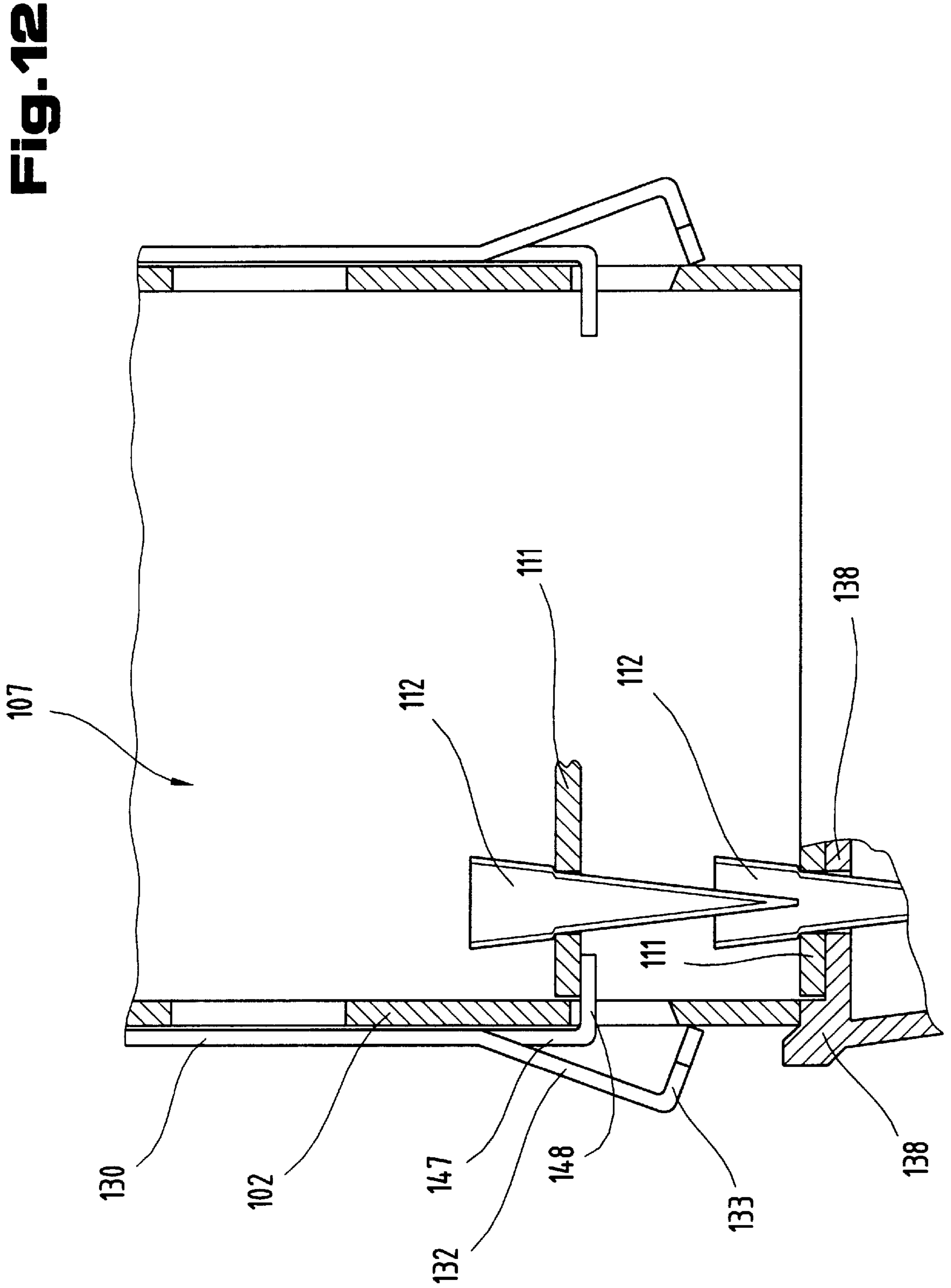
Figure 13:
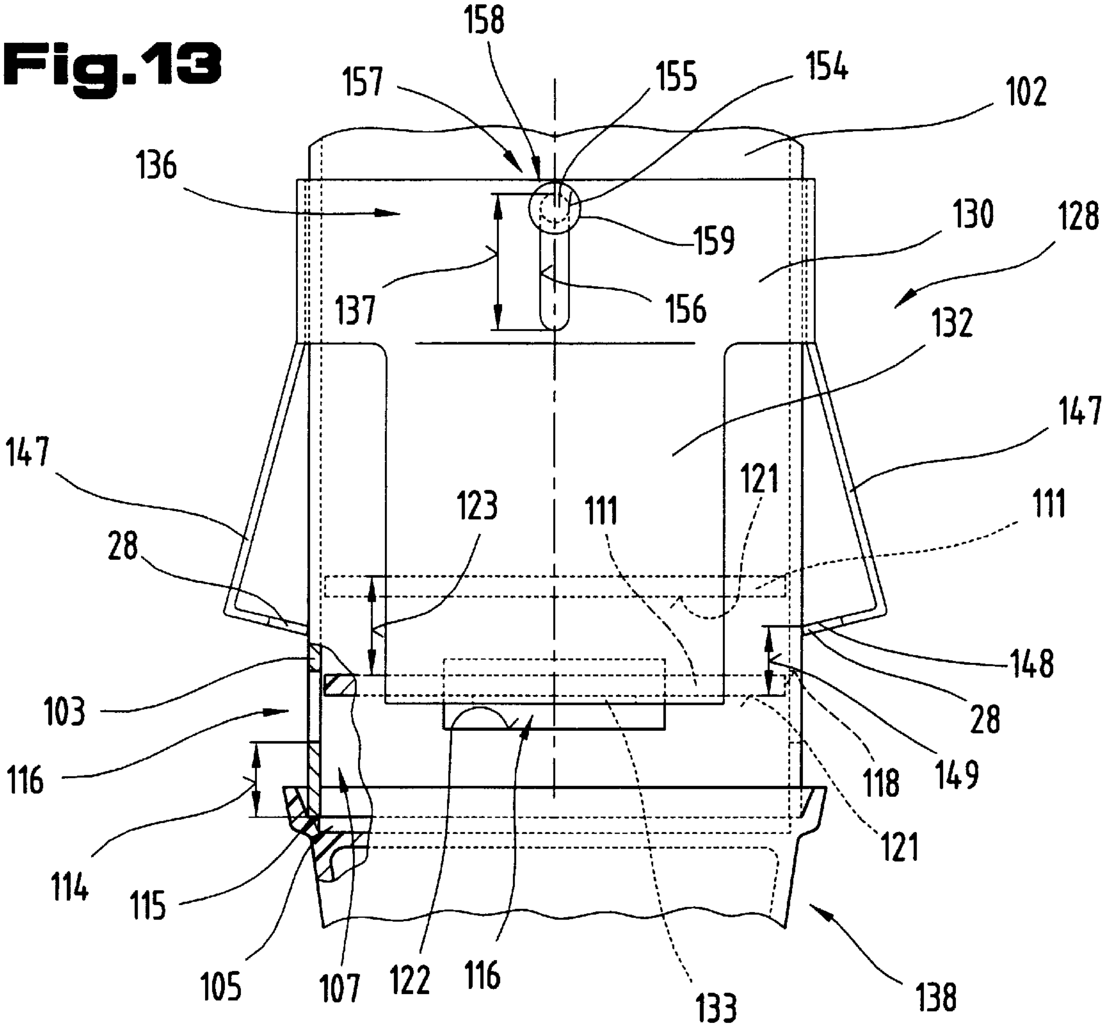
Figure 14:
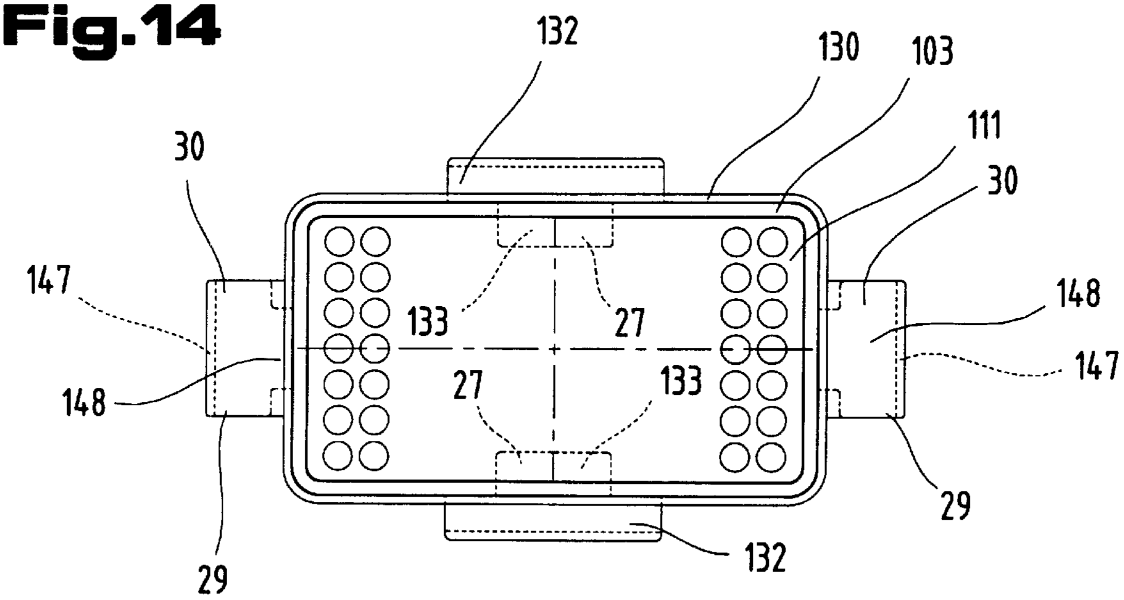
Figure 15:
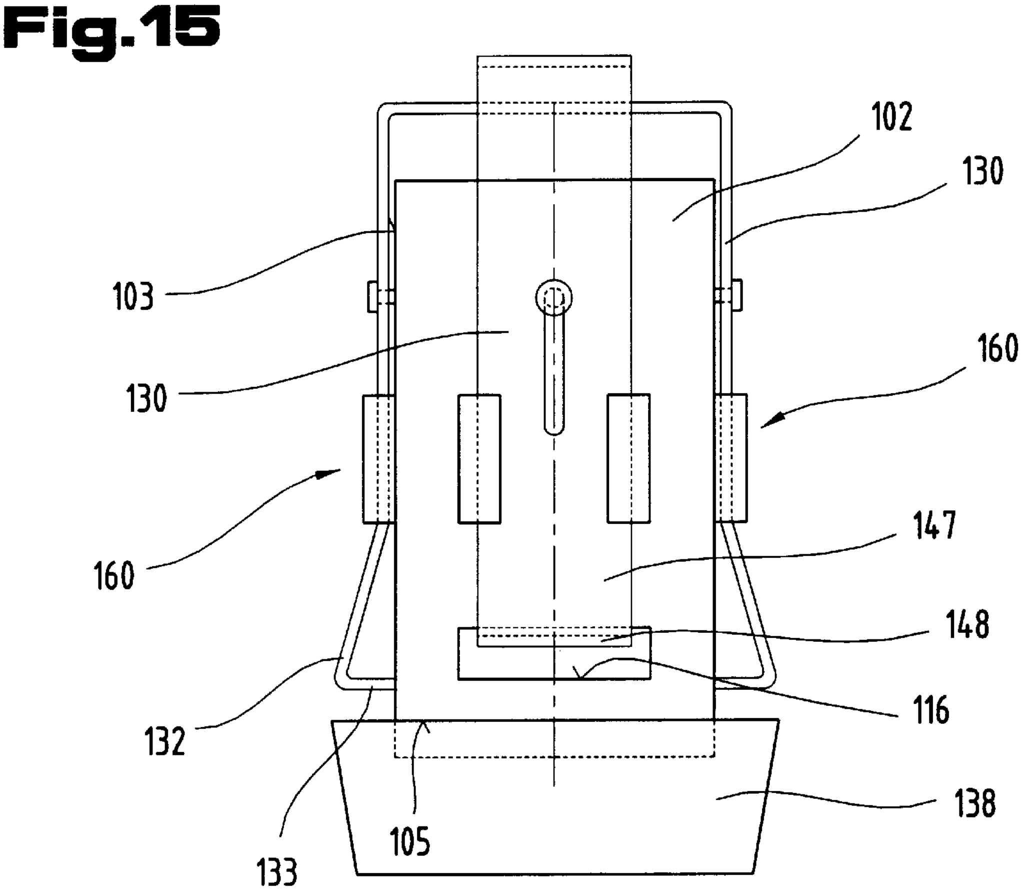
Figure 16:
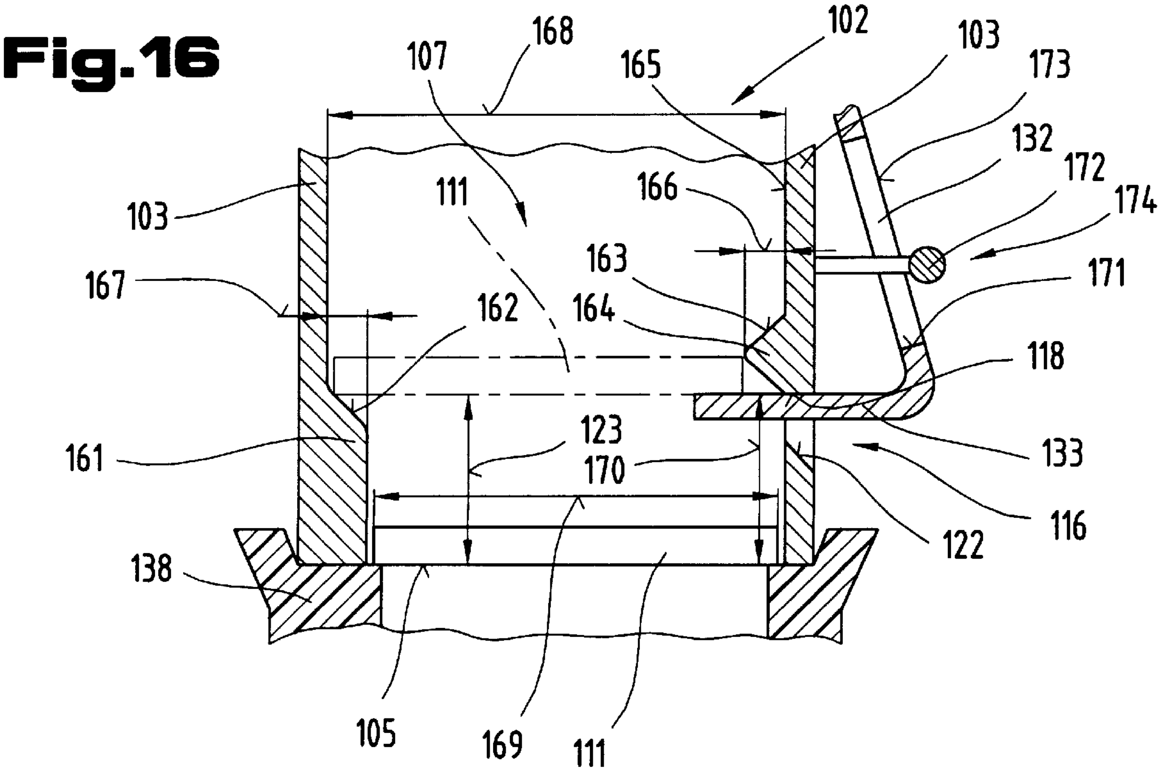

Shown are:

FIG. 1 a storage container according to the invention in partly cross-sectional front view;

FIG. 2 a slide for the storage container according to FIG. 1 also in a partly cross-sectional front view;

FIG. 3 a slide for the storage container according to FIG. 1 from underneath;

FIG. 4 position of the unloading device before the release of the first consumer article;

FIG. 5 position of the unloading device after the release of the first consumer article;

FIG. 6 position of the unloading device before the removal of the second consumer article;

FIG. 7 an unloading device according to the invention with a storage container for a stack of palettes in partial cross section;

FIG. 8 a partial region of the storage container with an output device in holding position, in cross section;

FIG. 9 a partial region according to FIG. 8 in a release position of the holding device;

FIG. 10 a different embodiment of the unloading device according to the invention with the storage container in view;

FIG. 11 the unloading device with the storage container, in cross section, along the lines XI—XI of FIG. 10;

FIG. 12 the unloading device according to FIG. 11 in release position for the separate removal of a palette;

FIG. 13 an additional design of an unloading device with a storage container in view, partly in cross section;

FIG. 14 the unloading device with the storage container in plan view;

FIG. 15 an additional design of the storage container of the invention with a U-shaped slide in view;

FIG. 16 a detailed view of a different embodiment of the separating device with an storage container, in cross section.

Firstly, it should be noted that in the description of the different embodiments the same parts are given the same reference numbers and/or the same component names, whereby the disclosures contained in the entire description can be applied to the same parts with the same reference numbers and/or the same component names. In addition, individual characteristics of the shown different embodiments can represent independent solutions according to the invention.

In order—as shown in FIG. 1—to be able to stack-pack, stackable consumer articles 1, for example palettes 2, which have a mainly rectangular shape, with holes 3 in which small components 4 such as e.g. pipette tips 5 are inserted, and form projecting holding edges 6 along the rectangular sides, a cuboid storage container 7 fitted to the shape of the consumer articles 1 and designed as a stack housing is provided with a removable base seal 8, designed as a base insert, which has upright side parts 9 designed as support walls to support the stack of consumer articles 1 inside the storage container 7. The storage container 7 forms a magazine for the consumer articles, is closed by a lid 10 and provided with a viewing opening 11 in the form of a viewing window for checking the content. On all four side walls 12, 13 at a distance adjusted to the required space underneath the holding edges 6 of the consumer articles 1 from a face edge 14 of the storage container 7 forming a base edge openings 15, 16 designed as engagement openings are provided in order to give access for an unloading device to an inner chamber 17 of the storage container 7.

As an unloading device for the separate removal of consumer articles 1 through the opened base opening 18,—as shown in FIGS. 2 and 3—a slide 19 which can be slid onto the storage container 7 is provided, which is e.g. in the form of a covering sleeve, and which on all four sleeve sides 20, 21 in the bottom edge region forms downwards pointing, flexible holding arms 22, 23 designed as holding tongues, with inwardly angled hook-shaped limit stops 24, 25. Said limit stops 24, 25, have projecting holding parts 29, 30 widened relative to the engagement openings, so that with the sleeve or slide 19 pushed onto the storage container 7 depending on the relative height to the openings 15, 16 the limit stops 24, 25 engage with their holding parts 27, 28 into the openings 15, 16 and are supported with the bearing parts 29, 30 on the side walls 12, 13 of the storage container 7, the other one above or below the openings 15, 16 the holding parts 27, 28 are pushed out of the latter and are supported on the side walls 12, 13. The width 26 of the holding parts 27, 28 can here correspond to a width 31 of the openings 15, 16 or be smaller than the that of the openings 15, 16.

The limit stops 24, 25 lie in pairs opposite the side walls 12, 13, whereby the respectively opposite limit stops 24 or 25 are arranged at the same level as the two holding parts 27 or 28. The limit stops 24 or their holding arms 27 are however relative to the limit stops 25 or the holding arms 28 offset in height by a vertical offset 32 which is smaller than the height 33 of the openings 15, 16 and also smaller than the distance 34 between the holding edges 6 of two consumer articles 1 stacked on top of one another.

In order to restrict the relative displaceability between the storage container 7 and slide 19 there is an bottom slide stop 35 and a top slide stop 36, whereby the bottom slide stop 35 comprises outwardly projecting sleeve tabs 37 of the slide 19 and the top slide stop 36 comprises side tabs 38 of the storage container 7.

If the storage container 7 is used as packaging, it holds, as indicted in FIG. 1, a stack of consumer articles 1 and is sealed by the base seal 8, whereby the base seal 8 with its side parts 9 supports and secures the stack of consumer articles inside the storage container 7 and also covers the openings 15, 16.

Should consumer articles 1 now be removed individually out of the storage container 7 as an unloading device the slide 19 is pushed from below onto the storage container 7 up to the top slide stop 36, so that the limit stops 25 of the holding arms 23 lie in the region of the openings 16, which are still covered by the upright side parts 9 of the base seal 8.

If now to open the storage container 7 the base seal 8 is removed downwards the side parts 9 release the openings 15, 16 and the inwardly projecting limit stops 25 snap elastically into the openings 16, where they engage under the holding edges 6 of the bottom consumer article 1 in the stack, and take on the support function of the base seal 8, so that the latter can now be removed freely. In this way also the shaft base is completely open and the storage container 7 can be placed onto a suitable base 39 for the transfer of the individual consumer articles 1 which takes over the individual consumer articles 1 removed through the open housing base. In addition, after placing the storage container 7 onto the base 39 the slide 19 is pushed downwards relative to the storage container 7 to the bottom limit stops 25 or their holding parts 28 and also the top limit stops 24 or their holding parts 27 engage in the openings 15, 16, so that in this way the bottom last consumer article 1 is held by the lowest limit stops 25 or their holding parts 28, and the last consumer article 1 but one is held by the top limit stops 24 or their holding parts 27 by gripping under their holding edges 6 (FIG. 4).

If the slide 19 is now pushed further downwards the bottom limit stops 25 hit a bottom edge 40 of the openings 16 designed as the bottom opening edge and are pressed outwards on further pushing, so that they slide externally onto the side walls 13 and release the holding edge 6 of the last consumer article 1. The latter falls by force of gravity onto the base 39, as shown by dashed lines, where there is a suitable base and support (FIG. 5). In this case the bottom sliding stop 35 prevents by hitting the base 39 a further downwards sliding of the slide 19 relative to the storage container 7, whereby also a pressing out of the top limit stops 24 from the openings 15 extending between a top and bottom edge 41, 42 is prevented.

Pushing up the slide 19 then lifts up the consumer articles 1 remaining in the storage container 7, which are suspended on the top limit stops 24 or their holding parts 27 until the top limit stops 24 reach the top edge 41 of the opening 15, and on pushing further are pressed outwards, whereby the top limit stops 24 release the stack of consumer articles, which in this way slides by force of gravity to the bottom limit stops 25 which on sliding up the slide 19 are again snapped into the openings 16 which are delimited to the top by a top edge 43, and undergrip the holding edge 6 of the lowest consumer article 1 (FIG. 6).

The stack is now suspended instead on the top limit stops 24 or their holding parts 27 on the bottom limit stops 25 or their holding parts 28, whereby the top sliding stop 36 prevents further upwards sliding of the slide 19 relative to the storage container 7, and thereby also a pressing out of the bottom limit stops 25 from the assigned openings 16.

The base 39 with the individually unloaded consumer article 1 can be taken off from the storage container 7 and the consumer article 1 can be removed. For the new unloading of a consumer article 1 in turn the base or a different base 39 is placed at the base of the storage container 7, so that with a repeat downwards sliding of the slide 19 the limit stops 24 in turn engage in the opening 15 and hold the last consumer article 1 but one on its holding edge 6 (FIG. 4) so that the unloading process can be performed again.

The storage container 7 according to the invention is characterised by its simplicity, efficient manufacturability, operating safety and good handling properties.

In FIG. 7 a storage container 102, e.g. a box, is shown designed as packaging 101. It is cuboid and is formed by four side walls 103 arranged at right angles relative to one another and is sealed at one face end by a lid 104 formed e.g. by overlapping lid tabs. The other face end forming a base opening 105 is sealed by a bowl-shaped base part 106 which overlaps the side walls 103 in an inner chamber 107 of the storage container 102 with side parts 108 and is connected with the latter detachably e.g. by adhesive applied in points.

The storage container 102 is for holding palettes 111 fitted with components 1 10, e.g. holed palettes for storing pipette tips 112, whereby the palettes 111 are stacked in parallel to one another in the direction of a height 113 of the storage container 102, in that the pipette tips 112 of the individual layers are placed inside one another owing to their conical shape.

At least in two opposite side walls 103 at a distance 114 from face edges 115 of the side walls 103 defining the base opening 105 rectangular openings 116 are arranged approximately parallel to the face edges 115, which extend over a part of the width 117 of the side wall 103. A top edge 118 of the opening 116 opposite the face edge 115 has a distance 119 from the face edge 115, which corresponds approximately to a length 120, by which the pipette tips 112 project over an underside 121 of the palettes 111. The distance 114 by which a bottom edge 122 is spaced apart from the face edges 115 is smaller than the height 123 between the stacked palettes 111. The side parts 108 of the base part 106 overlap the side walls 103 up to the level of the top edge 118, whereby front faces 124 of the side parts 108 facing the inner chamber 107 form bearing surfaces 125 for the underside 121 of the lowest palette 111 of the stack of palettes when the storage container 102 is closed.

In at least one of the side walls 103 a slot-shaped viewing opening 126 is also arranged in the direction of the height 113, in order to be able to control the filling level of the storage container 102.

In the region of the base part 106 the face walls 103 of the face edge 115 have recesses 127 extending in the direction of the height 113, which make it possible to remove the base part 106 from the inner chamber 107 of the storage container 102.

The storage container 102 is also provided with a separating device 128 which is guided in a guiding device 129 arranged on preferably two opposite side walls 103 for a slide 130 with a guiding extension 131 adjustable therein in perpendicular direction to the base opening 105. The guiding extension 131 has a holding arm 132 projecting in the direction of the face edges 115, which comprises a hook-like limit stop 133 projecting in the direction of the side wall 103. The holding arm 132 is spring-loaded in the direction of the side wall 103, whereby the limit stop 133 penetrates the side wall 103 in the opening 116 and with the storage container 102 sealed by the base part 106 is restricted by the latter in its movement in the direction of the inner chamber 107.

If the base part 106 is now removed from the storage container 102 to release the base opening 105 the limit stop 133 because of the spring force—according to arrow 134—of the holding arm 132 passes through the opening 116 and thereby projects into the inner chamber 107, whereby the bottom palette 111 rests with its underside 121 on the top 135 of the limit stop 133, and the stack of palettes 111 in the storage container 102 is held back. The slide 130 can be in the form of a sleeve and surrounds the storage container 102 externally, and is preferably made of transparent material so that the visibility of the inner chamber 107 through the viewing opening 126 is not hindered. In addition, it is possible to provide the side walls 103 with one or more stops 136 by means of which a displacement movement 137 of the slide 130 is restricted.

In FIGS. 8 and 9 the individual unloading of the palette 111 with the pipette tips 112 from the storage container 102 is shown. The stack of palettes 111 is held back by the limit stops 133 projecting the opposite side walls 103 through the openings 116 into the inner chamber 107. The storage container 102 is placed with its base opening 105 onto a carrier housing 138, which comprises a cover plate 139 facing the palettes 111, which is provided with bores 140 arranged concentrically to the pipette tips 112. To remove a palette 111 the slide 130 and thereby the holding arms 132 is moved in the direction of the base opening 105—according to arrow 141. As shown by dashed lines the bottom edge 122 of the opening 116 forms a sliding track for the holding arm 132 or the limit stop 133 securely connected therewith, which permits the movement of the holding arm 132 and thereby the limit stop 133 against the spring force of the holding arm 132 in the opposite direction to the inner chamber 107 into a release position, in which the limit stops 133 slide onto an outer face 142 of the side walls 103 and release the inner chamber 107, whereby the stack of palettes 111 falls until the bottom palette 111 lies on the cover plate 139 of the carrier housing 138. The distance 114 of the bottom edge 122 of the opening 116 is selected from the bearing surface 143 of the carrier housing 138 for the face edges 115, so that between the bottom edge 122 and the underside 121 of the overlying palette 111 there is a distance 144, which is greater than a thickness 145 of the limit stop 133. If there is now a movement of the slide 130 and thereby the holding arm 132 in the opposite direction to the base opening 105 the limit stop 133 slides after reaching the opening 116 into the inner chamber 107 and thereby adopts a holding back position for the other palettes 111 in the stack. With the further movement of the slide 130 up to the top side 135 of the limit stop 133 on the top edge 118 of the opening 116 there is a lifting of the remaining palettes 111 in the storage container 102 from the palette 111 unloaded onto the carrier housing 138. So that with the interaction between the top edge 118 and the top side 135 the limit stop 133 is not pressed out of the opening 116 it is useful to provide a stop 136 for the slide 130 which restricts the sliding path.

Of course, a design is possible in which the slide 130 is designed as a sleeve surrounding the side walls 103, producing perfect guiding on the outer surfaces 142 of the storage container 102. With such a design it is also possible to provide openings 116 in all four side walls 103, and perform the separation of the palettes 111 from all four sides by means of holding arms 132 and limit stops 133 arranged on the sleeve, and thereby obtain a secure mounting and retaining of the stack of palettes 111. Such a design with holding arms 132 acting on all four sides is necessary for larger weights.

In FIGS. 10 to 12 a different embodiment of the storage container 102 and the separating device 128 is shown. In the description the same reference numbers are used for the parts already described in the preceding figures. The slide 130 surrounding the side walls 103 like a sleeve comprises in the direction of the base opening 105 the holding arm 132 with the limit stop 133 in the holding position passing through the opening 116 in the side wall 103 of the storage container 102 into the inner chamber 107, which limit stop comprises a holding part 27. In this way the stack of palettes 111 in the storage container 102 is securely held before unloading. On the slide 130 there is a further tongue-like holding arm 147 extending further in the direction of the base opening 105 formed by a U-shaped cut-out 146 which comprises a retaining extension 148 designed as a holding part 28 projecting in the direction of the side wall 103. Relative to the limit stop 133 the retaining extension 148 is offset opposite the direction of the base opening 105 by a vertical offset 149, which is smaller than the vertical distance 123 between the two palettes 111 stacked on top of one another. The height 150 of the opening 116 is equal to the vertical offset 149.

If in this embodiment the slide 130 is moved for the individual removal of a palette 111 in the direction of the base opening 105, the limit stop 133 is moved by the bottom edge 122 of the opening 116 acting as a sliding track in the direction of the release position, in which the limit stop 133 releases the inner chamber 107, by means of the elastic displaceability of the holding arm 132. At the same time the retaining extension 148 preloaded with the slide 130 via the holding arm 147 in the direction of the inner chamber 107 reaches the top edge 118 of the opening 116 and with a continuation of the movement of the slide 130 penetrates into the inner chamber 107 between the palette 111 released by the limit stop 133 and thereby holds back the overlying stack of palettes 111. The released bottom palette 111 is hereby placed onto the carrier housing 138, on which the storage container 102 is placed to unload the palettes 111.

If the slide 130 is now moved away in the opposite direction, i.e. from the base opening 105, the top edge 118 of the opening 116 acts as a sliding track for the retaining extension 148 and moves the latter with the holding arm 147 into a release position, in which the retaining extension 148 releases the inner chamber 107. At the same time the holding arm 132 with the limit stop 133 pivots after exceeding the bottom edge 122 of the opening 116 as a result of the elastic preloading into the inner chamber 107. Thereby the stack of palettes 111 in the inner chamber 107 is lowered to the level of the limit stop 133 and is prepared for the individual removal of a further palette 111.

The previously unloaded palette 111 with the pipette tips 112 can be removed with the carrier housing 138 for further treatment, and a prepared additional carrier housing or the same carrier housing 138 can be positioned under the storage container 102 after the removal of the palette 111 with the pipette tips 112 for the removal of a further palette 111.

For the perfect functioning of the separating device 128 it is necessary to adjust a vertical offset 149 between the limit stop 133 and the retaining extension 148 to the height 150 of the opening 116. The height 150 should be smaller than the vertical distance 123 between the stacked palettes 111. The vertical offset 149 including the thickness 145 of the retaining extension 148 or the limit stop 133 should be slightly smaller than the height 150 of the opening 116.

In order to prevent the slide 130 from being moved too far in the direction of the base opening 105 and thus sliding in the bottom position of the limit stop 133 onto the carrier housing 138, the slide 130 independently of the holding arm 132 has a sleeve tab 37 projecting in the direction of the base opening 105, which is aligned with the face edge 151 facing the base opening 105 with an underside 152 of the limit stop 133. The displacement path 137 between the stop 136 and the carrier housing 138 is thereby restricted, as the face edge 151 in the separating process is set onto a facing edge 153 of the carrier housing 138 and in this way further sliding is prevented.

As described above, also in this embodiment the design of the holding arms 132, 147 with the limit stop 133 and the retaining extension 148 is possible on at least two opposite side walls 103 with a corresponding arrangement of openings 116 and also on all four side walls 103.

In FIGS. 13 and 14 a different embodiment of the storage container 102 with the separating device 128 is shown. In this case the storage container 102 is surrounded by the slide 130 on all four side walls 103. On the slide 130 the holding arms 132, 147 projecting in the direction of the base opening 105 are arranged with the limit stops 133 and retaining extensions 148 formed in the shape of a hook in the direction of the storage container 102. In this case two holding arms 132 comprising the limit stops 133 are provided on opposite side walls 103 and the holding arms 147 with the retaining extensions 148 are provided on the additional opposite side walls 103. In this way a pairwise interaction of the opposite limit stops 133 and retaining extensions 148 is obtained for the safe positioning of the stack of palettes 111 and on the manipulation of their separate unloading of the face edges 115 arranged in the plane. From the base opening 105 openings 116 are arranged with the spacing 114 in all four side walls 103, which depending on the position of the slide 130, along the sliding path 137, are penetrated alternately by the limit stops 133 or retaining extensions 148, which have a vertical offset 149 relative to one another, which is smaller than the vertical distance 123 between adjacent and stacked palettes 111. In this embodiment by means of the vertically offset arrangement of the limit stops 133 and the retaining extensions 148 the function is achieved with the separate removal of palettes, as already described in the preceding claims.

If the palettes 111 are to be removed individually from the storage container 102 the separating device 128 formed by the slide 130 with the holding arms 132, 147 and limit stops 133 and retaining extensions 148 is pushed from below onto the storage container 102 up to the stop 136 delimiting the upper position. In this case the limit stops 133 are arranged in the region of the openings 116, which are still covered by upright side parts of the base part, as shown in FIG. 7. If the base part is now removed downwards because of the spring preloading of the holding arms 132 the limit stops 133 which comprise holding parts 27 enter the inner chamber 107 on the underside 121 of the bottom palette 111 and hold back the stack of palettes 111 in the inner chamber 107. If the slide 130 is now moved in the direction of the base opening 105, the limit stops 133 are pressed outwards on the bottom edge 122 of the opening 116 acting as a sliding track. At the same time the retaining extensions 148 reach the opening 116 and snap owing to the spring action of the holding arms 147 with holding parts 28 into the inner chamber 107 immediately underneath the underside 121 of the last palette 111 but one. In this way the remaining stack of palettes 111 is held back in the inner chamber 107, whilst the bottom palette 111 is released and falls onto the prepared carrier housing 138 as a result of gravity. With the following upwards movement of the slide 130 the stack of palettes 111 remaining in the inner chamber 107 is lifted up by the retaining extensions 148 projecting into the inner chamber 107. After reaching the top edge 118 of the opening 116 the retaining extensions 148 are pressed out of the inner chamber 107 against the action of the spring force of the holding arms 147, whilst at the same time the limit stops 133 after passing over the bottom edge 122 snap into the inner chamber 107. The stack of palettes 111 is thus lowered as a result of gravity from the level of the retaining extensions 148 to the level of the limit stops 133, whereby the separating device 128 is ready for a repeat of the unloading process.

To obtain sufficient elasticity for the holding arms 132, 147, which ensures a secure engagement of the limit stops 133 or retaining extensions 148 through the opening 116 into the inner chamber 107, a design is possible as described for FIG. 3. In this case on the side of the limit stops 133 or the retaining extension 148 bearing parts 29, 30 are provided, by means of which the holding arms 132, 147 are held by preloading in the direction of the storage container 102, even if the limit stops 133 or retaining extensions 148 project through the opening 116, in which the bearing parts 29, 30 are supported on the outside of the side walls 103 to the side of the openings 116, and hold the holding arms 132 147 opposite the slide 130 in a position angled relative to the slide 130 causing preloading in the direction of the storage container 102.

To restrict the sliding path 137 and determine a top and bottom end position 130 of the slide in this embodiment a stop arrangement 157 is provided in the form of a fixed stop 154, e.g. a bolt connected immovably to the storage container 102 and a longitudinal slot 156 arranged in the slide 130 in the direction of movement which is penetrated by the bolt 155. The bolt 155 forms also a guiding part 158 and can also be provided with a mushroom-shaped head 159 covering the longitudinal slot 156 which is connected detachably to the bolt 155.

In FIG. 15 the storage container 102 is shown fitted onto the carrier housing 138. On opposite side walls 103 guiding arrangements 160 for the slides 130 are arranged which permit displacement in the longitudinal direction of the storage container 102. The slides 130 are U-shaped in this embodiment and surround the storage container 102 from the upper side in the direction of the base opening 105, whereby projecting over the guiding arrangement 160, the slides 130 comprise the holding arms 132 with the limit stops 133 or holding arms 147 with retaining extensions 148 which are supported on the side walls 103 forming a preloading, and in the respective sliding position penetrate the openings 116 of the side walls 103. In this embodiment on pairwise opposite side walls 103 the slides 130 are provided with the holding arms 132 and the limit stops 133 and the holding arms 147 with the retaining extensions 148. The slide 130 with the limit stops 133 and the slide 130 with the retaining extensions 148 are operated independently in this embodiment. By means of the consecutive operation of the slide 130 with the limit stops 133 and the slide 130 with the retaining extensions 148 separate unloading is possible, as already described in the preceding figures.

In FIG. 16 a further embodiment is shown for the separate removal of palettes 111 from the storage container 102. In this embodiment one of the side walls 103 has a retaining strip 161 projecting into he inner chamber 107 in the direction of the opposite side wall 103, which is provided with a support surface 162 inclined in the direction of the base opening 105. The side wall 103 opposite the retaining strip 161 has the opening 116 for the limit stop 133. From the top edge 118 of the opening 116 extends in an opposite direction to the base opening 105 a positioning shoulder 164 forming a sliding track 163 and projecting from the side wall 103 into the inner chamber 107, which projects over an inner surface 165 by a distance 166, which is equal to a distance 167 by which the retaining strip 161 projects over the opposite side wall 103. An inside width 168 of the storage container 102 corresponds in this embodiment approximately to the length 169 of the palette 111 as well as the distance 166 or distance 167.

On activating the holding arm 132 with the limit stop 133, e.g. via the slide in the direction of the base opening 105, on reaching the bottom edge 122 of the opening 116 designed as a sliding track 163 by means of the resilient design of the holding arm 132 the limit stops 133 are pressed out of the inner chamber 107. In this case the palette 111 after passing the positioning shoulder 164 offset to the side from the retaining strip 161 is released by the limit stop 133 and owing to gravity passes the inclined support surface of the retaining strip and is thus unloaded onto the carrier housing 138. The distance 170 of the top edge 118 from the base opening 105 is slightly smaller than the vertical distance 123 between the stacked palettes 111.

In addition in this embodiment a counter stop 174 connected to the side wall 103 penetrating a slot-shaped recess 171 of the holding arm 132 and acting with a spacing element 172 on an outer surface 173 of the holding arm 132 is arranged. This effects in connection with the inclined position of the holding arm 132 with upwards movement an additional force component supporting the spring elasticity in the direction of the inner chamber 107 or a movement-dependent insertion of the limit stop 133 into the inner chamber 107.

Of course, the technical details and the described components, in particular the storage container 7, 102 and the slide 19, 130 with the holding arms 22, 23, 132, 147 and the limit stops 24, 25, 133 and the retaining extension 148 can be modified as desired within the scope of specialist knowledge. For a better understanding of the invention individual parts have been illustrated untrue to scale and enlarged.

Finally individual characteristics of the combinations of characteristics shown and described in the individual embodiments can also form the subject matter of separate solutions according to the invention.

List of Reference Numbers

1. consumer article
2. palette
3. hole
4. small component
5. pipette tip
6. holding edge
7. storage container
8. base seal
9. side part
10.lid
11.viewing opening
12.side wall
13.side wall
14.face edge
15.opening
16.opening
17.inner chamber
18.base opening
19.slide
20.sleeve side
21.sleeve side
22.holding arm
23.holding arm
24.limit stop
25.limit stop
26.width
27.holding part
28.holding part
29.bearing part
30.bearing part
31.width
32.vertical offset
33.height
34.vertical distance
35.slide stop
36.slide stop
37.sleeve tabs
38.side tabs
39.base
40.bottom edge
41.top edge
42.bottom edge
43.top edge
101.packaging
102.storage container
103.side wall
104.lid
105.base opening
106.base part
107.inner chamber
108.sode part
109.
110.component
111.palette
112.pipette tip
113.height
114.distance
115.face edge
116.opening
117.width
118.top edge
119.distance
120.length
121.underside
122.bottom edge
123.vertical distance
124.face surface
125.bearing surface
126.viewing opening
127.recess
128.separating device
129.guiding device
130.slide
131.guiding extension
132.holding arm
133.limit stop
134.arrow
135.top side
136.stop
137.displacement
138.carrier housing
139.cover plate
140.bore
141.arrow
142.outer surface
143.outer surface
144.distance
145.thickness
146.cut-out

147.holding arm
148.retaining extension
149.vertical offset
150.height
151.face edge
152.underside
153.face edge
154.fixed stop
155.bolt
156.longitudinal hole
157.stop arrangement
158.guiding element
159.head
160.guiding arrangement
161.retaining strip
162.support surface
163.sliding track
164.positioning shoulder
165.inner surface
166.distance
167.distance
168.inside width
169.length
170.distance
171.recess
172.spacing element
173.outer surface
174.counter stop

What is claimed is:

1. Storage container for a plurality of stackable consumer articles, such as palettes fitted with small components, with a cuboid shaft housing adjusted to the shape of the consumer articles and a base opening, characterised in that the storage container has openings on all four side walls at the same height close to the ground, and the height of the openings is greater in stacking direction than the vertical distance between holding edges of two consumer articles stacked on top of one another.

2. Storage container according to claim 1, characterised in that on the exteriors of at least the side walls of the storage container provided with openings at least one guiding device for a separating device is arranged, which is designed with limit stops and/or retaining extensions which project through openings in at least one side wall into the inner chamber of the storage container.

3. Storage container according to claim 1, characterised in that independent openings for the limit stops and/or retaining extensions are arranged in a side wall or a opening in one of two immediately adjacent side walls.

4. Storage container according to claim 1, characterised in that top and bottom edges of the openings opposite one another in stacking direction form sliding tracks for the limit stop and/or retaining extension.

5. Storage container according claim 1, characterised in that in at least one of the side walls a preferably slot-shaped viewing opening is arranged.

6. Storage container according to claim 1, characterised in that between the storage container and a guiding element of the separating device or the slide a slide stop or stop delimiting the sliding path in a direction perpendicular to the base opening is arranged.

7. Storage container according to claim 1, characterised in that the base opening of the storage container is designed to be closed by a base part connected detachably to the side walls.

8. Storage container according to claim 1, characterised in that a filling opening arranged opposite the base opening is designed to be closed by a lid.

9. Storage container according to claim 1, characterised in that the storage container is provided with a removable base seal or base part which in the inner chamber up to above the openings has upright side parts to support the stack of consumer articles.

10. Storage container according to claim 1, characterised in that the storage container is made of cardboard, plastic etc.

11. Storage container according to claim 1, characterised in that in the inner chamber of the storage container on the side wall opposite the slide a retaining strip is arranged with a support surface for the palettes inclined to the inner chamber in the direction of the base opening.

12. Storage container according claim 1, characterised in that the storage container is designed as a transport container for the palettes.

13. Slide, particularly for a shaft-shaped storage container, for the individual removal of stacked palettes for components, in particular holed palettes for pipettes tips, particularly claim 1, characterised in that the slide comprises at least one holding arm for guiding on an outer surface of a side wall of the storage container in a direction perpendicular to the base opening and in that the latter is connected movably with at least one projecting limit stop and/or retaining extension, which is preferably elastically restorable together with the holding arm.

14. Slide according to claim 13, characterised in that the limit stop or retaining extension has a holding part suitable for engaging in a opening and a bearing part that is broader than the holding parts.

15. Slide according to claim 13, characterised in that on the holding arm or a guiding-part thereof a limit stop or retaining extension adjustable perpendicularly and independently thereto is arranged, which has a projecting holding part.

16. Slide according to claim 13, characterised in that the holding part of a limit stop or retaining extension in stacking direction has a vertical offset to a holding part of a limit stop or retaining extension, which is smaller than a vertical distance between stacked palettes.

17. Slide according to claim 13, characterised in that the limit stop or the retaining extension is arranged on an additional holding arm which is provided in addition to the holding arm with the limit stop and is adjustable therewith in a plane parallel to the plane of the base opening.

18. Slide according claim 13, characterised in that the holding arm with the limit stop and/or the holding arm with the limit stop or retaining extension is arranged on a common slide.

19. Slide according claim 13, characterised in that the slide (19, 130) is formed by a guiding sleeve.

20. Slide according to claim 1, characterised in that the guiding sleeve is designed as hollow cube.

21. Slide according claim 13, characterised in that the holding arms and/or the guiding sleeve is made of a elastically resilient material, e.g. plastic or metal.

22. Slide according to claim 13, characterised in that the slide is made of a semi-rigid transparent film, in particular Plexiglas.

23. Slide according to claim 13, characterised in that on at least two opposite side walls of the slide a holding arm with a limit stop and/or a holding arm with a limit stop or retaining extension is arranged.

24. Slide according to claim 13, characterised in that the holding arm with the limit stop and/or retaining extension is designed with a bearing part projecting perpendicularly thereto for spring-loading.

25. Slide according to claim 13, characterised in that the guiding sleeve forming the slide on all four sleeve sides in the lower edge region has downwards pointing flexible holding arms.

26. Slide according to claim 13, characterised in that the limit stops or retaining extensions assigned to the opposite sleeve sides are arranged in the same first plane perpendicular to the longitudinal direction of the slide and in that the holding arms assigned to the two perpendicular sleeve sides are arranged with the limit stops in a parallel second plane in the longitudinal direction of the slide spaced apart from the first plane.

27. Slide according to claim 13, characterised in that a vertical offset between the two planes arranged vertically offset to the longitudinal direction of the slide, which hold the limit and/or retaining extensions, is smaller than the vertical distance between the holding edges of two consumer articles stacked on top of one another which are to be separated.

28. Unloading device for the separate removal of stacked palettes, particularly holed palettes for pipette tips, characterised in that on a storage container according to claim 1 at least one slide according to is arranged.

29. Unloading device according to claim 28, characterised in that the limit stop or retaining extension is arranged in stacking direction in a vertical offset to the limit stop which is smaller than a vertical distance between the stacked palettes.

30. Unloading device according to claim 28, characterised in that to at least one opening of the storage container a limit stop and/or retaining extension penetrating the side wall is assigned.

31. Unloading device according to claim 28, characterised in that the slide in perpendicular direction to the plane of the base opening is arranged adjustably on the storage container.

32. Unloading device according to claim 28, characterised in that the slide with its guiding sleeve surrounds the side walls of the storage container.

33. Unloading device according to claim 28, characterised in that in at least one side wall of the storage container different openings are assigned to the limit stops and/or retaining extensions.

34. Unloading device according to claim 28, characterised in that the holding arms for the limit stops and/or retaining extensions are separated by border cuts along their border line from the surrounding parts of the slide or the sleeve side for displacement relative to the storage container and are connected in at least one part region with the guiding sleeve or the slide.

35. Unloading device according to claim 28, characterised in that the holding arm or the limit stops and/or retaining extensions forms a face end of the slide or the sleeve side facing the base opening.

36. Unloading device according to claim 28, characterised in that the slide is U-shaped and the two holding arms face two parallel opposite side walls of the storage container and are guided along the latter.

37. Unloading device according to claim 28, characterised in that several slides with U-shaped cross-sections for the limit stops and/or retaining extensions are assigned to a storage container.

38. Unloading device according to claim 28, characterised in that an upper stop is assigned to the slide.

39. Unloading device according to claim 28, characterised in that a bottom stop is assigned to the slide.

40. Unloading device according to claim 28, characterised in that the bottom stop is formed by a storage part of the palette to be separated and is formed by stop elements of the slide or the guiding sleeve projecting relative to the holding arms.

41. Unloading device according to claim 28, characterised in that the slide rests on the bottom stop at the latest when the top limit stops or retaining extensions rest on the bottom edge of the assigned openings.

42. Unloading device according to claim 28, characterised in that the top stop restricts the displaceability of the slide or the guiding sleeve at the latest when the limit stop lies on the top edge of the assigned opening.

43. Unloading device according to claim 28, characterised in that opposite face sides of a recess in the slide or a sleeve side of the guiding sleeve interact with a fixed stop arranged on the storage container.

44. Unloading device according to claim 28, characterised in that the guiding device is formed by a longitudinal hole in the slide or the guiding sleeve.

45. Unloading device according to claim 28, characterised in that the limit stops and/or retaining extensions are formed by edged parts of the slide or the guiding sleeve or the holding arms.

46. Unloading device according to claim 28, characterised in that bottom edges and/or top edges of the openings, in particular in a direction perpendicular to the sliding direction of the slide or the guiding sleeve extend from the inner chamber outwards, are in particular designed to run obliquely or conically.

47. Unloading device according to claim 28, characterised in that by means of the top edges and/or bottom edges running perpendicular to the sliding direction of the slide face edges of the openings run at an angle towards one another in the direction of the inner chamber.

48. Unloading device according to claim 28, characterised in that the guiding arrangement for the slide or the guiding sleeve is arranged on the storage container in sliding direction spaced apart from the limit stops and/or retaining extensions.

49. Unloading device according to claim 28, characterised in that the limit stops and/or retaining extensions are arranged in a plane running perpendicular to the longitudinal direction of the storage container.

50. Unloading device according to claim 28, characterised in that the limit stops and/or retaining extensions with a position of the holding arms on the side walls project over the side walls and are arranged overlapping the base opening from the outside.

51. Unloading device according to claim 28, characterised in that a guiding element in the opening of the holding arm or the slide or the guiding sleeve is designed as an end stop at a distance of the bearing part from the side wall corresponding perpendicularly to the side wall of the storage container.

52. Storage container for a plurality of stackable consumer articles, such as palettes fitted with small components, with a cuboid shaft housing adjusted to the shape of the consumer articles and a base opening, characterised in that the storage container has openings at the same height close to the floor on at least two opposite side walls and the height of the openings is greater in stacking direction than the vertical distance between holding edges of two consumer articles stacked on top of one another.

* * * * *

UNITED STATES PATENT AND TRADEMARK OFFICE
CERTIFICATE OF CORRECTION

PATENT NO. : 6,079,593
DATED : June 27, 2000
INVENTOR(S) : Konrad

It is certified that error appears in the above-identified patent and that said Letters Patent is hereby corrected as shown below:

Column 13, line 53, after "according" insert --to--.

Column 14, line 14, after "according" insert --to--; line 32, "guiding-part" should read --guiding part--; line 46, after "according" insert --to--; line 50, after "according" insert --to--; line 51, cancel "(19, 130)"; line 52, "claim 1" should read --claim 13--; line 54, after "according" insert --to--.

Column 15, line 23, after "to" insert --claim 13--.

Signed and Sealed this

Twenty-second Day of May, 2001

*Attest:*

NICHOLAS P. GODICI

*Attesting Officer* *Acting Director of the United States Patent and Trademark Office*